Inventors:
EDWIN T. LORIG, EDWIN E. MOORE
and JOHN T. NICHOLS.
by Usina & Rauber
their Attorneys.

Aug. 4, 1936.  E. T. LORIG ET AL  2,050,106
PRESSURE MEASURING APPARATUS
Filed Nov. 21, 1934  3 Sheets-Sheet 2

Inventors:
EDWIN T. LORIG, EDWIN E. MOORE
and JOHN T. NICHOLS.
by:
their Attorneys.

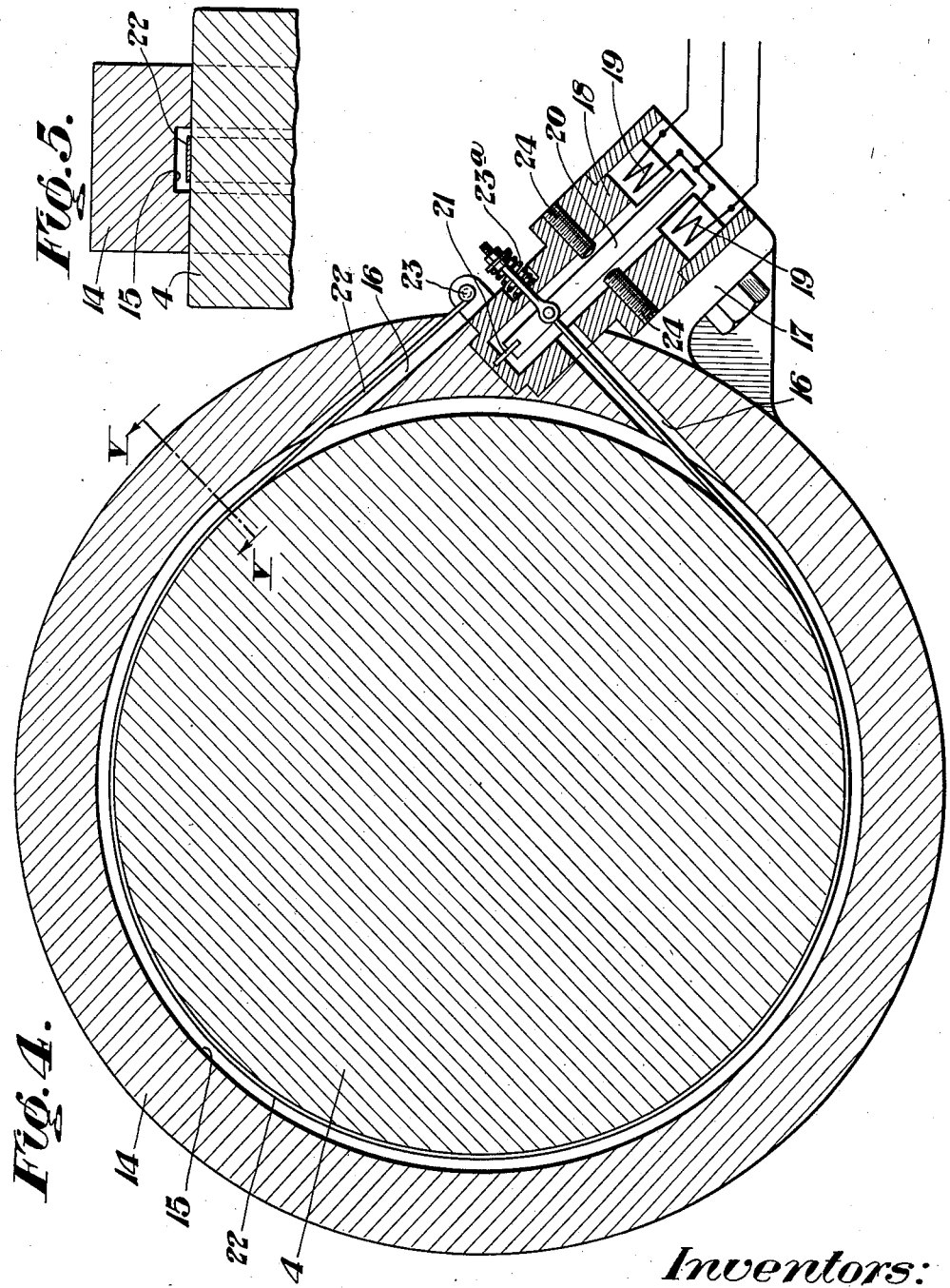

Patented Aug. 4, 1936

2,050,106

UNITED STATES PATENT OFFICE 2,050,106

PRESSURE MEASURING APPARATUS

Edwin T. Lorig, Gary, Ind., Edwin E. Moore, Chicago, Ill., and John T. Nichols, Pittsburgh, Pa., assignors to American Sheet and Tin Plate Company, a corporation of New Jersey Application November 21, 1934, Serial No. 754,152

4 Claims. (Cl. 265—1)

This invention relates to heavy duty apparatus capable of accurately measuring pressures of the order of several million pounds, and while not limited thereto is particularly adapted for application to a rolling mill to measure the forces exerted on the rolls by the pressure screws in accordance with the method set forth in our co-pending application, Serial No. 663,012, filed March 27, 1933.

The present invention is of particular value in measuring the forces exerted on the rolls of a "four-high" cold rolling strip mill, which forces are ordinarily referred to as the "screw down pressures", and on mills of this type which have recently been developed and gone into wide commercial use the screw down pressures ordinarily used are from one-half to seven million pounds with the normal load approximately five million pounds. Cold rolled strip steel ordinarily produced by the above described four-high mills must generally be rolled with a gage tolerance of one-thousandth of an inch. Therefore, it is of utmost importance that means be provided to measure and/or indicate the screw down pressure since only slight variations in screw down pressure will cause the gage of the strip being rolled to vary materially more than the tolerance.

The present invention has for its object the provision of an apparatus capable of functioning under the severe conditions set forth above and also capable of measuring accurately the tremendous pressures being continually delivered to it.

Referring to the drawings,

Figure 4 is a horizontal cross-section of a modification of the invention from the line IV—IV of Figure 2, and Figure 5 is a cross-section from the line V—V in Figure 4 taken 90° from the position of the latter.

Figure 1:
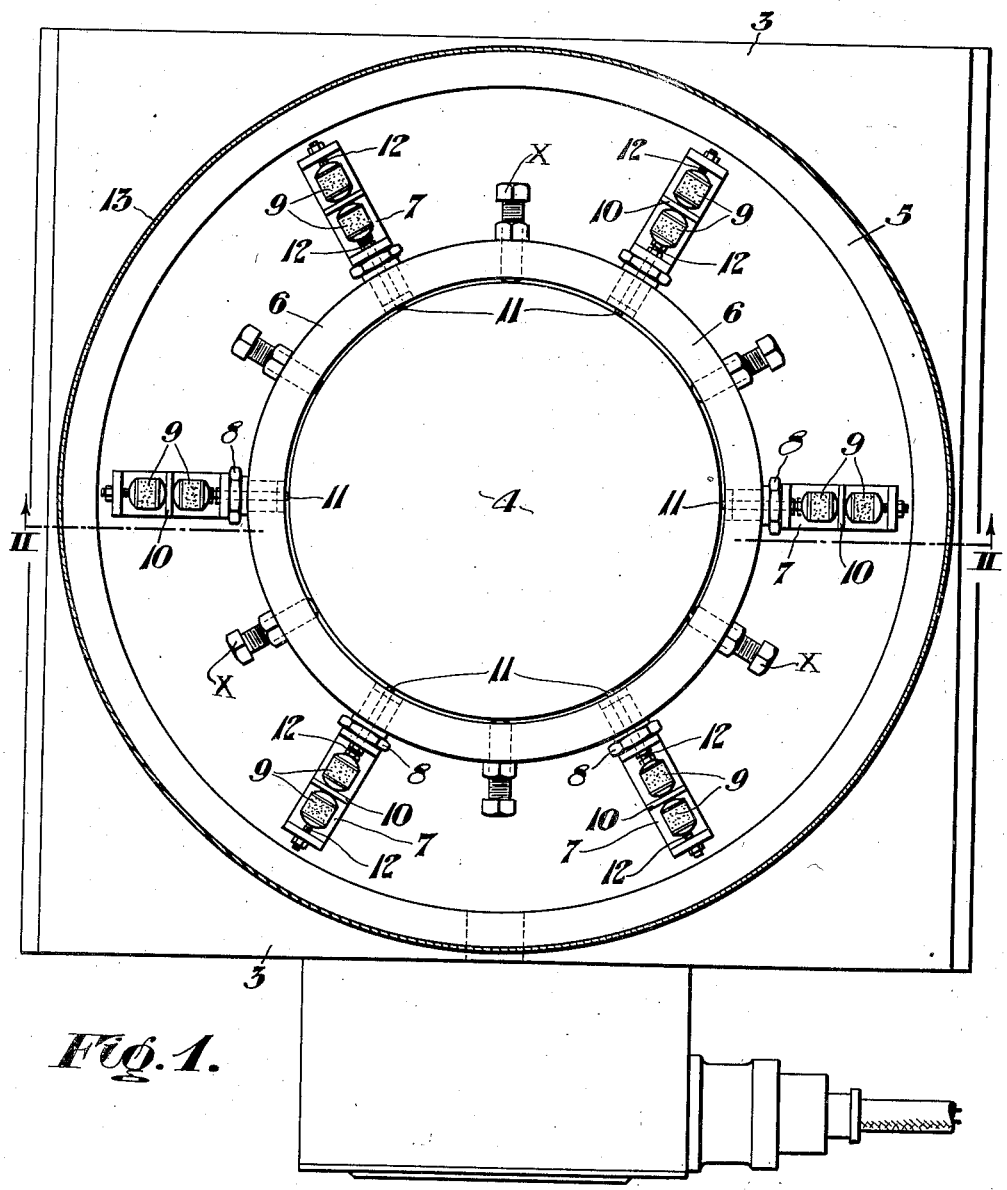
Figure 1 is a top plan of one form of the invention.

These drawings show only that part of a mill necessary to illustrate the invention. They include the bottom end of a pressure screw 1 bearing against a breaker block 2 which applies the force of this screw to a roll journal 3 through a solid cylindrical pressure block 4 carried in a housing 5. This pressure block is constructed from a deformable, elastic material, such as steel, and its deformation is measured to secure an indication of the pressures applied therethrough.

The above is, broadly speaking, old. That is to say, the measurement of a deformable material through which pressures are transmitted in order to indirectly measure these pressures has already been done. It has been done, however, by measuring the longitudinal deformation of the pressure block and this has introduced serious inaccuracies, because it is practically impossible to construct the block sufficiently uniformly to obtain an even compressive displacement throughout. Such inaccuracies are avoided by the present invention in the following manner.

When pressure is being transmitted through the block 4 and the above mentioned longitudinal deformation has taken place, there will also be a lateral deformation of the block's circumference. That is to say, the block will bulge when compressed longitudinally. It follows that this lateral movement will be just as much in proportion to the pressure increment at any one point as will the longitudinal deformation, and may be used to indicate the various pressure applications. The advantages are that this bulge may be measured at a plurality of points so that an average of the total distortion may be reached which is much more accurate than when obtained in the old manner.

It is essential that the block 4 be of such character and size that the tremendous pressures applied will cause only a limited lateral deformation within the elastic limit of the block, Regardless of the character and size of the block 4 or the amount of pressure or load applied, it has been found that each block must be separately calibrated for given loads since separate blocks made from the same heat of steel will have varying deformations for the same loads or pressures.

Preferably, the bulge or deformation measurements are taken at a plurality of points spaced evenly about the circumference of the block 4, and an average obtained. An even more accurate indication may possibly result when the block 4 is encircled by a band and the end movement of this band used to operate a suitable telemetric measuring device.

One form of apparatus suitable for measuring the circumferential displacement of the block 4 may be constructed by encircling it with a ring 6. This ring may be suitably held on the block's circumference; as, for instance, by capscrews X. At spaced points it is drilled and tapped so that it can mount housings 7 by means of threaded and bored coupling members 8. These housings 7 carry carbon piles 9 whose operating levers 10 are driven by plungers 11 which extend through the coupling members 8 and thus contact the pressure block.

These carbon piles may be series-interconnected and arranged in a circuit with a suitable source of electricity and a milliamperemeter, the whole being suitably calculated to convert the averaged movements of the plungers 11 into the familiar roll poundage reading. This telemetric system mentioned is intended to be merely suggestive, and may be substituted by other means for indicating the motion of the plungers 11 in an averaged manner.

A convenient means of constructing the above may consist in making the levers 10 and the housings 7 integral, the levers consisting of upstanding parts of sufficient length to insure flexibility. The carbon piles may then each have their extremes provided with points 9a which are engaged by adjustable screws 12 and by the levers 10. The plungers 11 are then fixed directly to the levers and thus themselves mounted in place. This construction provides the requisite simplicity and resistance to shocks needed for mill work.

The housing 5 is necessarily constructed in two sections to permit the longitudinal compression of the pressure block 4. An annular shield 13 is bolted to the upper section of this housing and covers the slot or space between it and the lower section. This shield can then telescope over this lower section to permit the necessary movement.

Another form of apparatus suitable for measuring the bulge or lateral displacement of the block 4 may be constructed as follows.

A ring 14 having an internal annular groove 15 is shrunk or otherwise fastened directly to the block. The groove 15 communicates with the outside of the ring 14 through tangentially directed slots 16. This ring also carries an external bracket 17 which mounts a housing 18. This housing contains a pair of opposed solenoids 19 between which the free end of an armature 20 is arranged. The other end of this armature is mounted by a leaf spring 21. A flexible band 22 passes through the slots 16 and encircles the block 4. One end of this band is immovably fixed to a screw 23 and the other end to the armature 20 at a point close to its mounted end.

As the pressure block is laterally deformed, this band will move the armature 20 so that the solenoids 19, which are actually field coils, are inductively varied.

Figure 2:
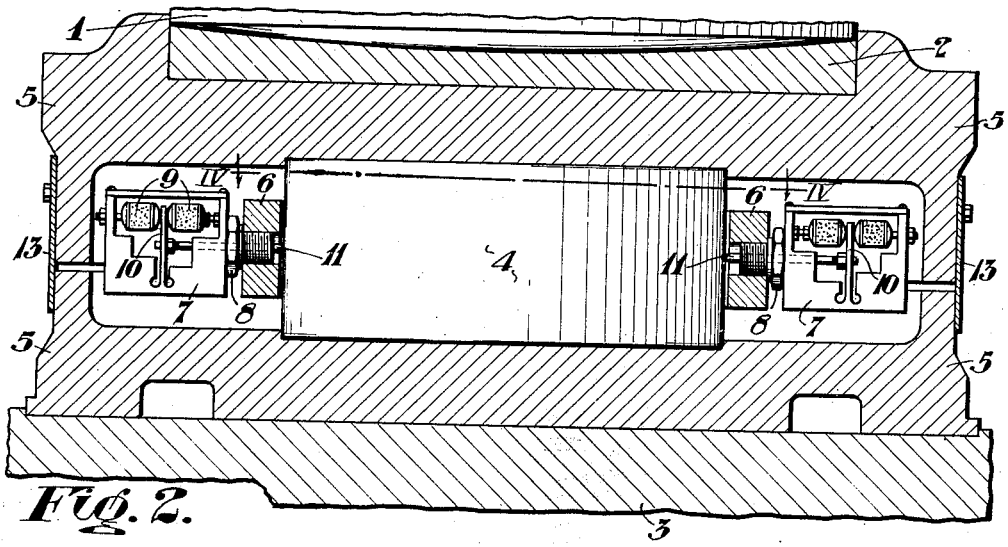
Figure 2 is a cross-section from the line II—II of Figure 1.
Figure 3:
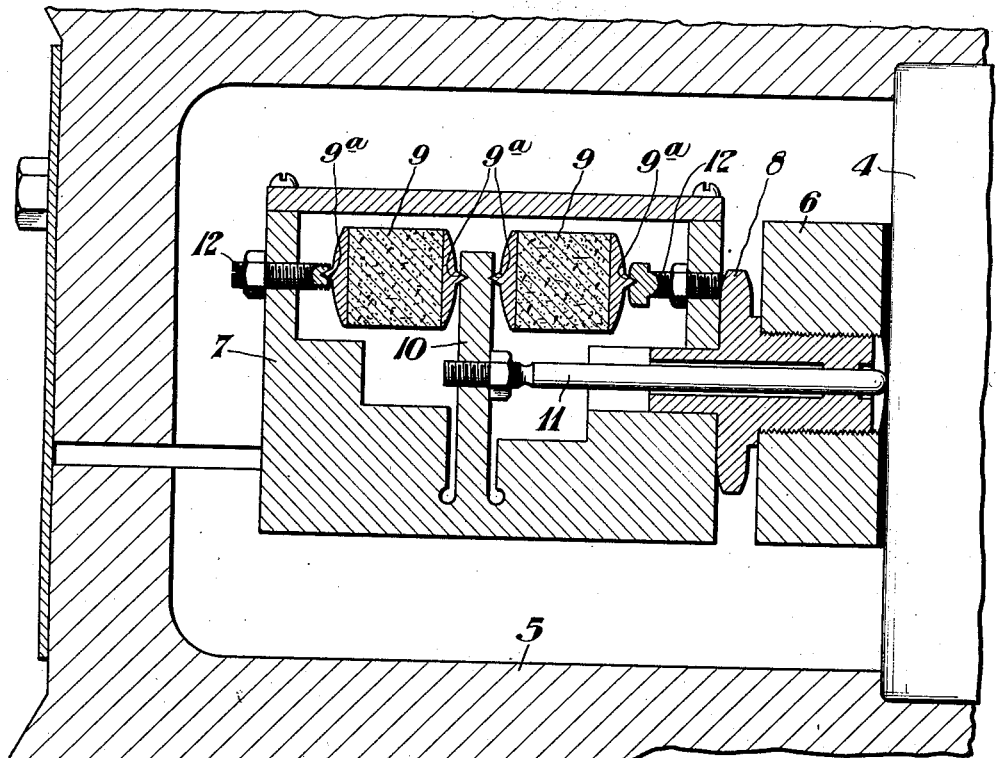
Figure 3 is an enlarged detail from Figure 2.

These solenoids may be suitably arranged in a vacuum tube circuit to operate an indicator. It is, of course, possible to substitute the carbon piles 9 of Figures 1, 2 and 3 for these solenoids or, in fact, to measure the displacement of the band 22 in any other manner which may prove desirable.

In the form shown the band 22 is preferably wrapped around the screw 23, which may then be turned to take up excessive band material. Also, the armature 20 is preferably provided with a spring 23a which is balanced against the natural pull or tension of the band 22 so that accurate results may be assured. Screws 24 hold the motion of the armature within reasonable limits.

When the above is in operation, the ring 14 expands or contracts with the block 4. It also forms a protective housing for the band 22 and a mount for the telemetric head which measures this band's displacement. In general, if both the encircling band or supporting ring and the block are made of materials having the same coefficients of linear thermal expansion, no error will result due to temperature changes.

We are aware that various forms of pressure measuring apparatus are suggested in the prior art, including apparatus in which liquids are displaced either directly or through the medium of the changing section of a metal member; however, apparatus of this type are impractical for use with such heavy duty apparatus as the four-high cold rolling mills above described due to the inherent compressibility of fluids which would cause material error in the results obtained.

While we have shown a certain specific embodiment of our invention it will be understood that we do not wish to be limited thereto, since various modifications may be made without departing from the scope of the appended claims.

We claim:

1. Apparatus for continuously measuring high pressures comprising the combination with means for delivering said pressures and means for receiving said pressures, of a solid steel block positioned between said delivering and receiving means and arranged to continuously receive said pressures in a given direction, said block being capable of deformation laterally of said direction as a result of said pressures and being of such character that said deformation will be within its elastic limit, and means for continuously measuring the variation in the girth of said block to indicate said pressures.

2. Apparatus for measuring forces comprising, in combination, a deformable element disposed to receive said forces, said deformable element being free to change in girth under said forces, said change in girth being lateral of the direction of application of said forces, a gage device for indicating said forces, and means for operating said gage device, said last-named means being in contact with the girth of said deformable element and responsive to variations therein.

3. Apparatus for measuring forces comprising, in combination, a deformable element disposed to receive said forces, said deformable element being free to change in girth under said forces, said change in girth being lateral of the direction of application of said forces, a gage device for indicating said forces, and means for operating said gage device, said last-named means being in contact at spaced intervals with the girth of said deformable element and responsive to variations therein.

4. Apparatus for measuring forces comprising, in combination, a deformable element disposed to receive said forces, said deformable element being free to change in girth under said forces, said change in girth being lateral of the direction of application of said forces, a gage device for indicating said forces, and means for operating said gage device, said last-named means being in continuous contact with at least the major portion of the girth of said deformable element and responsive to variations therein.

EDWIN T. LORIG.
EDWIN E. MOORE.
JOHN T. NICHOLS.